US006578033B1

(12) United States Patent
Singhal et al.

(10) Patent No.: US 6,578,033 B1
(45) Date of Patent: *Jun. 10, 2003

(54) SYSTEM AND METHOD FOR ACCESSING A SHARED COMPUTER RESOURCE USING A LOCK FEATURING DIFFERENT SPIN SPEEDS CORRESPONDING TO MULTIPLE STATES

(75) Inventors: Ashok Singhal, Redwood City, CA (US); Erik Hagersten, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 09/597,863

(22) Filed: Jun. 20, 2000

Related U.S. Application Data

(63) Continuation of application No. 09/100,667, filed on Jun. 19, 1998, now Pat. No. 6,148,300.

(51) Int. Cl.[7] ............................................... G06F 17/30
(52) U.S. Cl. ........................................................... 707/8
(58) Field of Search ............................... 707/2, 8, 201

(56) References Cited

U.S. PATENT DOCUMENTS

| | | | |
|---|---|---|---|
| 4,725,834 A | 2/1988 | Change et al. | 340/825 |
| 4,750,109 A | 6/1988 | Kita | 366/200 |
| 4,807,118 A | 2/1989 | Lin et al. | 364/200 |
| 4,922,408 A | 5/1990 | Davis et al. | 364/200 |
| 5,055,999 A | 10/1991 | Frank et al. | 364/200 |
| 5,341,483 A | 8/1994 | Frank et al. | 395/400 |
| 5,351,043 A | 9/1994 | Hullett et al. | 340/82.5 |
| 5,495,481 A | 2/1996 | Duckwall | 370/85.2 |
| 5,502,840 A | 3/1996 | Barton | 395/726 |
| 5,506,961 A | 4/1996 | Carlson et al. | 395/186 |

FOREIGN PATENT DOCUMENTS

| | | |
|---|---|---|
| EP | 0616709 | 9/1994 |
| EP | 0817042 | 1/1998 |

OTHER PUBLICATIONS

Dijkstra, "Solution of a Problem in Concurrent Programming Control," Communications of the ACM, vol. 8, No. 9, Sep. 1965, p. 569.

Gustavson, "The Scalable Coherent Interface and Related Standards Projects," IEEE Micro, 1992, p. 10.

International search report application number 99304532.7–2201 mailed Dec. 10, 2002.

"Performance of Spin Lock Alternatives for Shared –Memory Multiprocessors", Anderson, *IEEE Transactions on Parallel and Distributed Systems*, Jan. 1990, No. 1, New York, US.

*Primary Examiner*—Safet Metjahic
*Assistant Examiner*—Cam-Linh T. Nguyen
(74) *Attorney, Agent, or Firm*—Meyertons Hood Kivlin Kowert & Goetzel, P.C.; B. Noël Kivlin

(57) ABSTRACT

A probabilistic queue lock divides requesters for a lock into at least three sets. In one embodiment, the requesters are divided into the owner of the lock, the first waiting contender, and the other waiting contenders. The first waiting contender is made probabilistically more likely to obtain the lock by having it spin faster than the other waiting contenders. Because the other waiting contenders spin more slowly, the first waiting contender is more likely to be able to observe the free lock and acquire it before the other waiting contenders notice that it is free. The first of the other waiting contenders that determines that the previous first waiting contender has acquired the lock is promoted to be the new first waiting contender and begins spinning fast. Because only the first waiting contender is spinning fast on the lock, it is probable that only the first waiting contender will attempt to acquire the lock when it becomes available.

20 Claims, 5 Drawing Sheets

U.S. PATENT DOCUMENTS

| | | | |
|---|---|---|---|
| 5,548,728 A | 8/1996 | Danknick | 395/200 |
| 5,557,792 A * | 9/1996 | Josten et al. | 707/8 |
| 5,592,486 A | 1/1997 | Lo et al. | 370/389 |
| 5,778,388 A * | 7/1998 | Kawamura et al. | 707/2 |
| 5,860,159 A | 1/1999 | Hagersten | 711/151 |
| 5,878,485 A | 3/1999 | Wood et al. | 29/825 |
| 6,026,401 A * | 2/2000 | Brealey et al. | 707/201 |
| 6,148,300 A * | 11/2000 | Singhal et al. | 707/8 |

* cited by examiner

SYSTEM AND METHOD FOR ACCESSING A SHARED COMPUTER RESOURCE USING A LOCK FEATURING DIFFERENT SPIN SPEEDS CORRESPONDING TO MULTIPLE STATES

This application is a continuation of U.S. patent application Ser. No. 09/100,667, entitled "Hybrid Queue and Backoff Computer Resource Lock Featuring Different Spin Speeds Corresponding to Multiple States", filed Jun. 19, 1998 now U.S. Pat. No. 6,148,300.

BACKGROUND OF THE INVENTION

1. Field of the Invention

This invention relates to the field of computer systems and, more particularly, to systems and methods of optimizing lock operations within computer systems.

2. Description of the Related Art

Computer systems can suffer severe performance degradation as a result of lock operations. In general, lock operations are associated with software locks which are used by computer systems to ensure that only one process at a time can access a resource, such as a critical region of memory. Throughout this specification, a memory region is used as an example of a resource associated with a lock. It is noted that the disclosed invention is equally applicable to other resources, such as an input/output location. A variety of locks have been implemented, ranging from simple spin-locks to advanced queue-based locks. Although simple spin-lock implementations can create very bursty traffic as described below, they are still the most commonly used software lock within computer systems.

Systems employing locks typically require that a given process perform an atomic operation to obtain access to a critical memory region. For example, an atomic test-and-set operation is commonly used. Generally speaking, an atomic operation is an indivisible operation. In other words, another process cannot access the lock between the test and set portion of the atomic operation. The test-and-set operation is performed to determine whether a lock bit associated with the memory region is cleared and to atomically set the lock bit. That is, the test allows the process to determine whether the memory region is free of a lock by another process, and the set operation allows the process to acquire the lock if the lock bit is cleared.

Referring now to FIG. 1, a diagram illustrating a spin-lock implementation is shown. In a spin-lock implementation, if the test of the lock bit indicates that the memory region is currently locked, i.e. another process has acquired the lock, the requesters for the lock initiate a loop wherein the lock bit is continuously read until the lock bit is cleared, at which time the process reinitiates the atomic test-and-set operation. Generally speaking, requesters are processes or other entities that seek to acquire the lock. Spin-locks may be implemented using either optimistic or pessimistic spin-lock algorithms. An optimistic spin-lock is depicted by the following algorithm:

```
top:
    atomic_test&set        ;read-to-own transaction
    if failed
        begin
            while busy spin    ;spin on read-to-share transaction
            goto top
        end
```

For the optimistic spin-lock algorithm shown above, the process first performs an atomic test-and-set operation upon the lock bit corresponding to the memory region for which access is sought. If the atomic test-and-set operation fails, the process reads the lock bit in a repetitive fashion until the lock bit is cleared by another process. The process then reinitiates the atomic test-and-set operation. Generally speaking, a read-to-own (RTO) transactions requests write access to data and a read-to-share (RTS) transaction requests read access to data. It is noted that names other than RTO and RTS may be used to describe the concepts of acquiring read and write access to data.

A pessimistic spin-lock is depicted by the following algorithm:

```
top:
    while busy spin        ; spin on read-to-share
    atomic_test&set       ; read-to-own
    if failed
        begin
            goto top
        end
```

For the pessimistic spin-lock algorithm, the process first reads the lock bit corresponding to the memory region for which access is sought in a repetitive fashion until the lock bit is cleared. When the process determines that the lock bit is clear in accordance with the read operation(s), the process performs an atomic test-and-set operation to lock and gain access to the memory region. If the test failed upon execution of the atomic test-and-set operation, the process again repetitively reads the lock bit until it is cleared.

In a shared memory computer system in which the requester performs a system bus, or global, transaction to test and set the lock, the above spin-lock algorithms create a large number of bus transactions. If the lock is not available, each requester attempting to acquire the lock bit continually performs global transactions until the lock becomes available. This large number of global transactions may adversely affect the performance of the computer system by using a large portion of the available bandwidth.

To reduce the number of global transactions performed by a spin-lock algorithm, the lock bit may be cached by each requester attempting to acquire it. In this manner, the repetitive reads to determine the state of the lock bit may be local transactions rather global transactions. While this may reduce the number of global transactions, the coherency traffic on the bus generated when the state of the lock bit changes may be unacceptable.

In a cached shared memory system, the read (or test) of the lock bit is treated as a read-to-share (RTS) operation. Since the atomic test-and-set operation includes a write, it is treated as a read-to-own (RTO) operation. The system will thus place the coherency unit containing the lock bit in a modified state in response to the atomic test-and-set operation.

For both the pessimistic and optimistic algorithms discussed above, when a memory region corresponding to a contended spin-lock is released, the owner writes to the lock to free it generating a RTO operation (1 bus transaction) which invalidates the line in the caches of all other devices. Therefore, all N spinning requesters subsequently miss and generate RTS transactions for the cache line containing the lock. The first requester to receive a data reply detects the free lock and generates an RTO transaction (1 bus transaction). Since the requester of each of the remaining RTS requests similarly receive an indication that the lock is free, each of these requesters also generates a RTO transaction (N−1 bus transactions). When the first RTO transaction is received, the requester issuing that transaction locks and gains access to the memory region. The test-and-set operations corresponding to the RTO requests of the remaining requesters therefore fail. The remaining N−2 requesters generate RTS transactions to cache the new lock bit (N−2 bus transactions).

Thus, the total number of transactions is potentially 3N−1 for the single transfer of a spin-lock from one requester to another (where N is the number of contenders for the lock). Due to this large number of transactions, the latency associated with the release of a lock until the next contender can acquire the lock is relatively high. The large number of transactions can further limit the maximum frequency at which ownership of the lock can migrate from node to node. Finally, since only one of the spinning requesters will achieve the lock, the failed test-and-set operations of the remaining processors result in undesirable RTO requests on the network. The coherency unit in which the lock is stored undesirably migrates from requester to requester, invalidating other copies. Network traffic is thereby further increased despite the fact that the lock is set.

Several lock designs to improve the performance of spin-locks have been devised, such as back-off locks and queue locks. In back-off locks, the requesters contending to acquire the lock implement a delay between attempts to acquire the lock. In this manner, the number of requesters contending for the lock at a given instance of time is reduced. The lock may be released and acquired by another requester before some requesters detect that the lock has been freed. Accordingly, the number of processes that attempt to acquire the lock when it becomes available is reduced. Low contention for the lock reduces the number of transactions when the lock changes state. The requesters that do not contend for the lock will generate a read-to-share transaction to read the new lock bit, but will not generate the read-to-share and read-to-own transactions to attempt to acquire the lock.

The delay implemented by a backup lock may be constant or variable. In a constant delay implementation, the requester delays a fixed time between attempted accesses to the lock. In a variable delay implementation, the duration of the delay may be different for different requesters. An exponential back-off lock is one example of variable delay back-off lock. In a exponential back-off lock, the delay implemented by the requester increases with each unsuccessful attempt to acquire the lock.

Back-off locks unfortunately may delay the acquisition of the lock. When a lock becomes available, a delay may occur before a process attempts to acquire the lock. This delay can increase the latency of a lock operation and reduce the performance of the computer system. Further, back-off locks can create fairness problems. Because each contending process has an equal chance of acquiring the lock, a process then has just begun waiting for the lock may be more likely to acquire the lock before a process that has been waiting for a long time. It is also theoretically possible for a waiting process to never acquire the lock.

Queue locks are another technique for reducing the overhead of lock operations. Referring now to FIG. 2, each requester for the lock is queued up behind earlier requesters. In this manner, only the process at the head the queue attempts to acquire the lock when it becomes available and generates bus transactions. Queue locks have the added benefit that they may be more fair than spin-locks because the earlier processes get the lock before processes that enter the queue later.

Unfortunately, in practice, queue locks have several disadvantages. For example, queue locks require space proportional to the number of queued requesters instead of the constant space required by spin-locks. This may make queue locks incompatible with some synchronization library interfaces. Further, if the process at the head of the queue is suspended or currently not running, the other processes behind the suspended process may not be able to acquire the lock. Still further, queue locks may be less efficient then spin locks if there is no contention for lock. Overhead may be incurred to check the queue to verify that no requesters are waiting to acquire the lock.

SUMMARY OF THE INVENTION

The problems outlined above are in large part solved by a probabilistic queue lock in accordance with the present invention. The probabilistic queue lock is a hybrid of a queue lock and a back-off lock. The probabilistic queue lock divides requesters for the lock into at least three sets. In one embodiment, the requesters are divided into the owner of the lock, the first waiting contender, and the other waiting contenders. The first waiting contender is made probabilistically more likely to obtain the lock by having it spin faster than the other waiting contenders. Because the other waiting contenders spin more slowly, the first waiting contender is more likely to be able to observe the free lock and acquire it before the other waiting contenders notice that it is free. The first of the other waiting contenders that determines that the previous first waiting contender has acquired the lock is promoted to be the new first waiting contender and begins spinning fast. A lock in accordance with present invention advantageously eliminates the delay in acquiring the lock present in back-off lock implementations, and eliminates the suspended process problems and variable space required by queue locks. At the same time, a lock implementation in accordance with the present invention advantageously reduces the number of transactions required to acquire the lock. Because only the first waiting contender is spinning fast on the lock, it is probable that only the first waiting contender will attempt to acquire the lock when it becomes available.

Broadly speaking, the present invention contemplates a method of synchronizing access to a resource in a computer system that includes a lock corresponding to the resource and a plurality of requesters that may attempt to access the resource, wherein the lock has at least three lock states. The method includes: a first requester of the plurality of requesters requesting acquisition of the lock; if the lock is in a free state, the first requester setting the lock to a held state and acquiring the lock; if the lock is in the held state, the first requester setting the lock to a wait state and spinning fast; and if the lock is in the wait state, the first requester spinning slow.

The present invention further contemplates a computer-readable storage medium comprising program instructions for synchronizing access to a resource in a computer system that includes a lock corresponding to the resource and a plurality of requesters that may attempt to access the resource, wherein the lock has at least three lock states. The program instructions are operable to implement the steps of: a first requester of the plurality of requesters requesting acquisition of the lock; if the lock is in a free state, the first requester setting the lock to a held state and acquiring the lock; if the lock is in the held state, the first requester setting the lock to a wait state and spinning fast; and if the lock is in the wait state, the first requester spinning slow.

The present invention still further contemplates a method of synchronizing access to a resource in a computer system that includes a lock corresponding to the resource and a plurality of requesters that may attempt to access the resource, wherein the lock has at least four lock states. The method includes: a first requester of the plurality of requesters requesting acquisition of the lock; if the lock is in a free state, the first requester setting the lock to a first held state and acquiring the lock; if the lock is in the first held state, the first requester setting the lock to a second held state and spinning fast; if the lock is in the second held state, the first requester setting the lock to a wait state and spinning medium; and if the lock is in the wait state, the first requester spinning slow.

BRIEF DESCRIPTION OF THE DRAWINGS

Other objects and advantages of the invention will become apparent upon reading the following detailed description and upon reference to the accompanying drawings in which.

Figure 1:
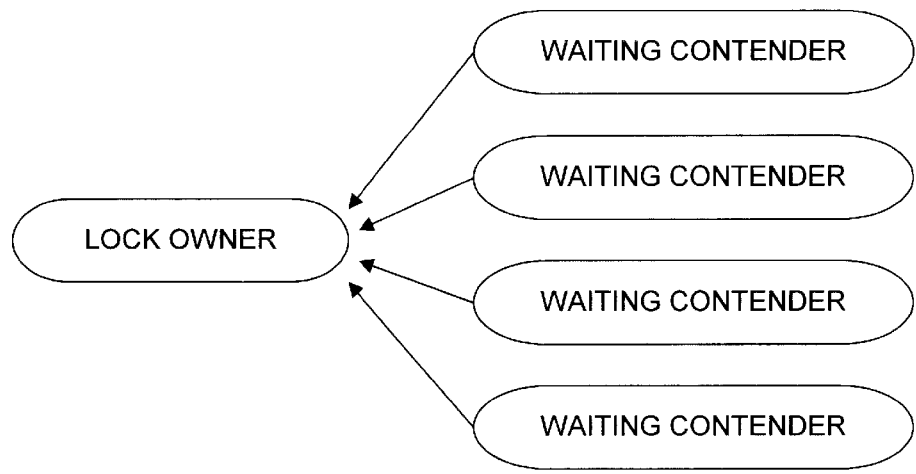
FIG. 1 is a diagram illustrating a spin-lock implementation.
Figure 2:
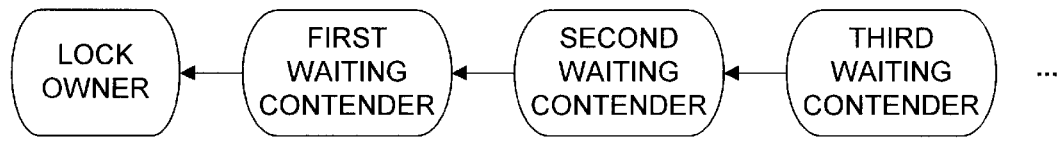
FIG. 2 is a diagram illustrating a queue lock implementation.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives failing within the spirit and scope of the present invention as defined by the appended claims.

DETAILED DESCRIPTION OF THE INVENTION

Figure 3:
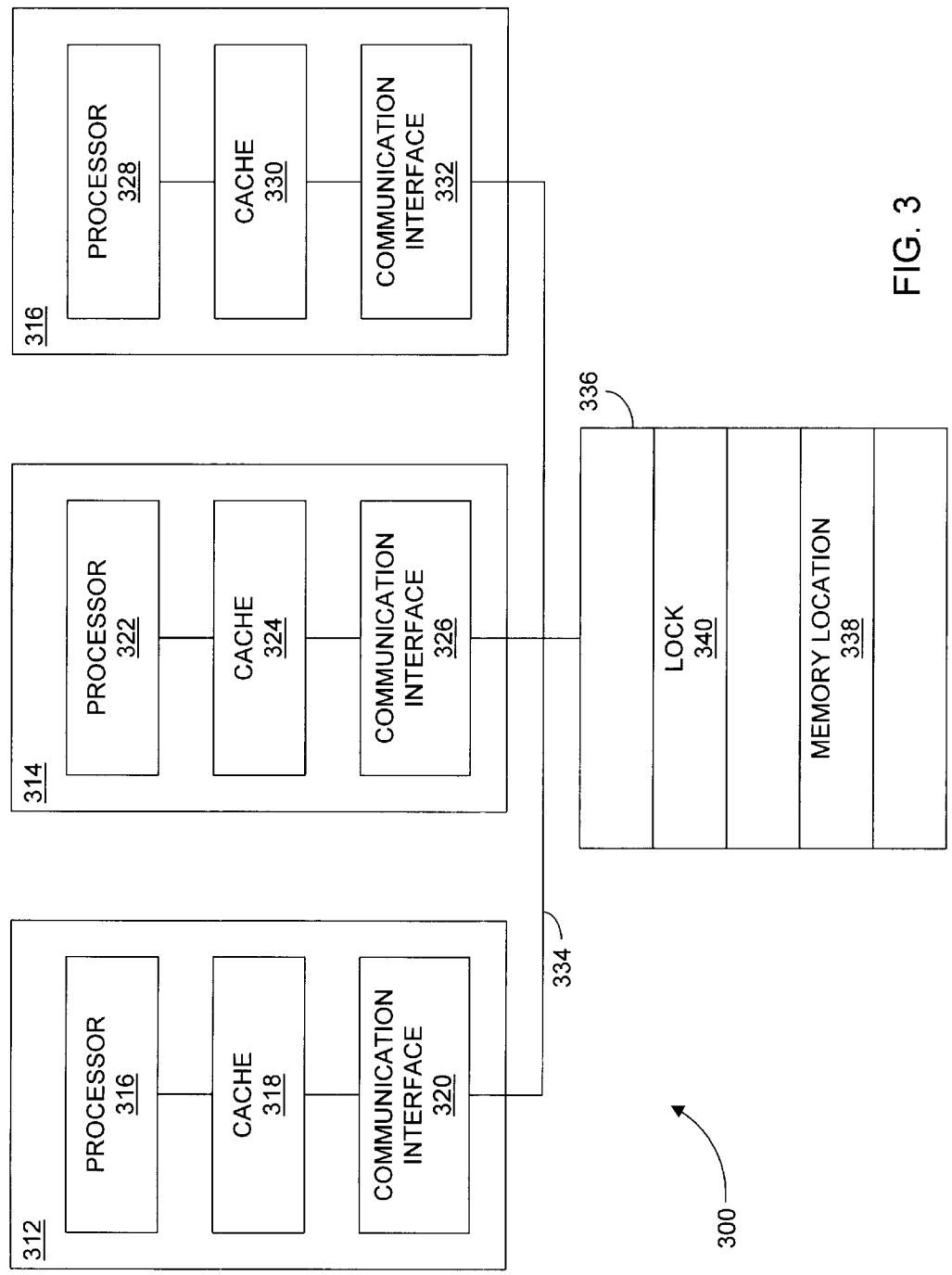
FIG. 3 is a block diagram of a multiprocessor computer system including a shared memory according to one embodiment of present invention.

Referring now to FIG. 3, a block diagram of a multiprocessor computer system including a shared memory according to one embodiment of the present invention is shown. Computer system 300 includes three nodes (312, 314 and 316) and a memory 336 interconnected by data communication bus 334. Node 312 includes a processor 316, a cache 318 and a communication interface 320. Node 314 includes a processor a 322, cache 324 and a communication interface 326. Node 316 includes a processor 328, a cache 330 and a communication interface 332. Nodes 312–316 and components within these nodes are conventional devices known to those of ordinary skill in the art. Memory 336 includes a plurality of storage locations including a memory location 338 and a lock 340. Communication interfaces 320, 326 and 332 provide an interface between data communication bus 334 any other components of the nodes. Memory 336 is a conventional storage device such as a random access memory (RAM).

Lock 340 may be used to synchronize access to memory location 338. Prior to accessing memory location 338, a node reads a lock state stored in lock 340 to determine whether another node (or another process) is accessing memory location 338. Nodes, processors, processes, or any other device that attempt to access memory location 338 are referred to as requesters. For example, multiple processors in a multiprocessing computer system or multiple processes executing on the same processor may request access to memory location 338.

If the lock is in a free state when a requester reads the state of the lock, i.e. no other requester is accessing memory location 338, then the requester may acquire the lock and access the memory location. When the requester acquires the lock, the requester may set the lock to a held state to indicate to other requesters that the memory location is being accessed. If the lock is in a held state when a requester reads the state of the lock, i.e. another requester is accessing memory location 338, the requester may wait until the lock becomes available to access memory location 338.

When a node acquires lock 340, it may cache the lock. Once the lock is cached, accesses to test the state of the lock are local accesses. If the state of the lock is modified by another node, the cached copy may be invalidated. When a requester detects that its cached copy is invalid (e.g., detects a cache miss), a requester may read the state of the lock from memory 336 to determine if it may access the memory location. It is noted, that both snooping or directory-based coherency protocols may be implemented.

Figure 4:
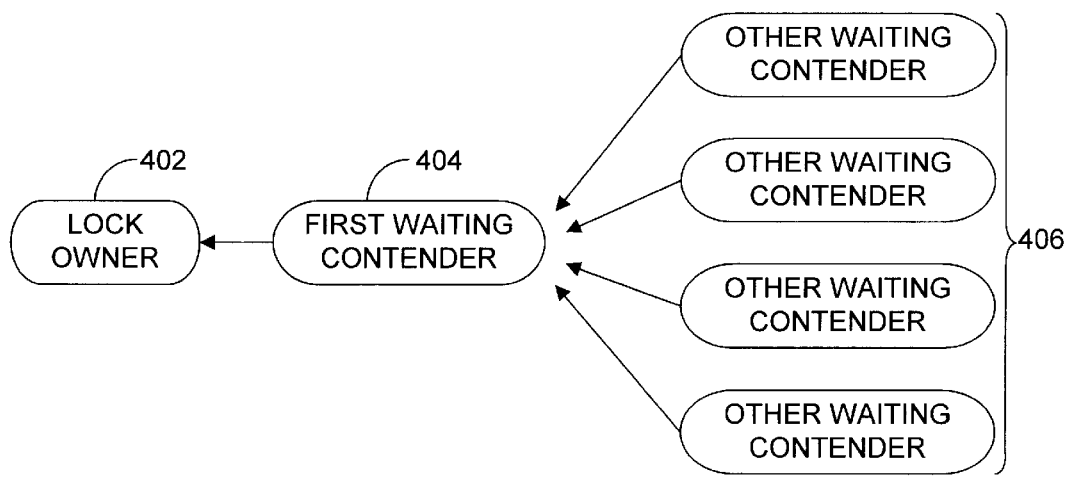
FIG. 4 is a diagram illustrating a probabilistic queue according to one embodiment of the present invention.

Turning now to FIG. 4, a diagram illustrating a probabilistic queue according to one embodiment of the present invention shown. The requesters attempting to acquire a lock are divided into three categories. The first device that requests the lock becomes a lock owner 412. The first requester subsequent to the lock owner that attempts to acquire the lock becomes the first waiting contender 414 for the lock. The requesters subsequent to the first waiting contender become other waiting contenders 416 for the lock. In one embodiment, first waiting contender 414 spins fast on the lock. In this embodiment, first waiting contender 414 is in a tight loop testing the state of the lock to determine when the lock becomes available. In one embodiment, other waiting contenders 416 spin slow on the lock. In other words, other waiting contenders 416 implement a delay between attempts to acquire the lock .

When the lock becomes available, there is a high probability that first waiting contender 414, which is spinning fast, will be the first requester to test the state of the lock and acquire the lock. Accordingly, with high probability, there will be low contention for the lock when it becomes available. As discussed above, low contention for the lock reduces the coherency traffic when the lock becomes available. Additionally, because first waiting contender 414 is spinning fast on the lock, the delay before it acquires the lock is minimized. Still further, if the first waiting contender is unable to acquire the lock (e.g., the process is suspended), an other waiting contender 416 will read and acquire the lock after some delay.

Figure 5:
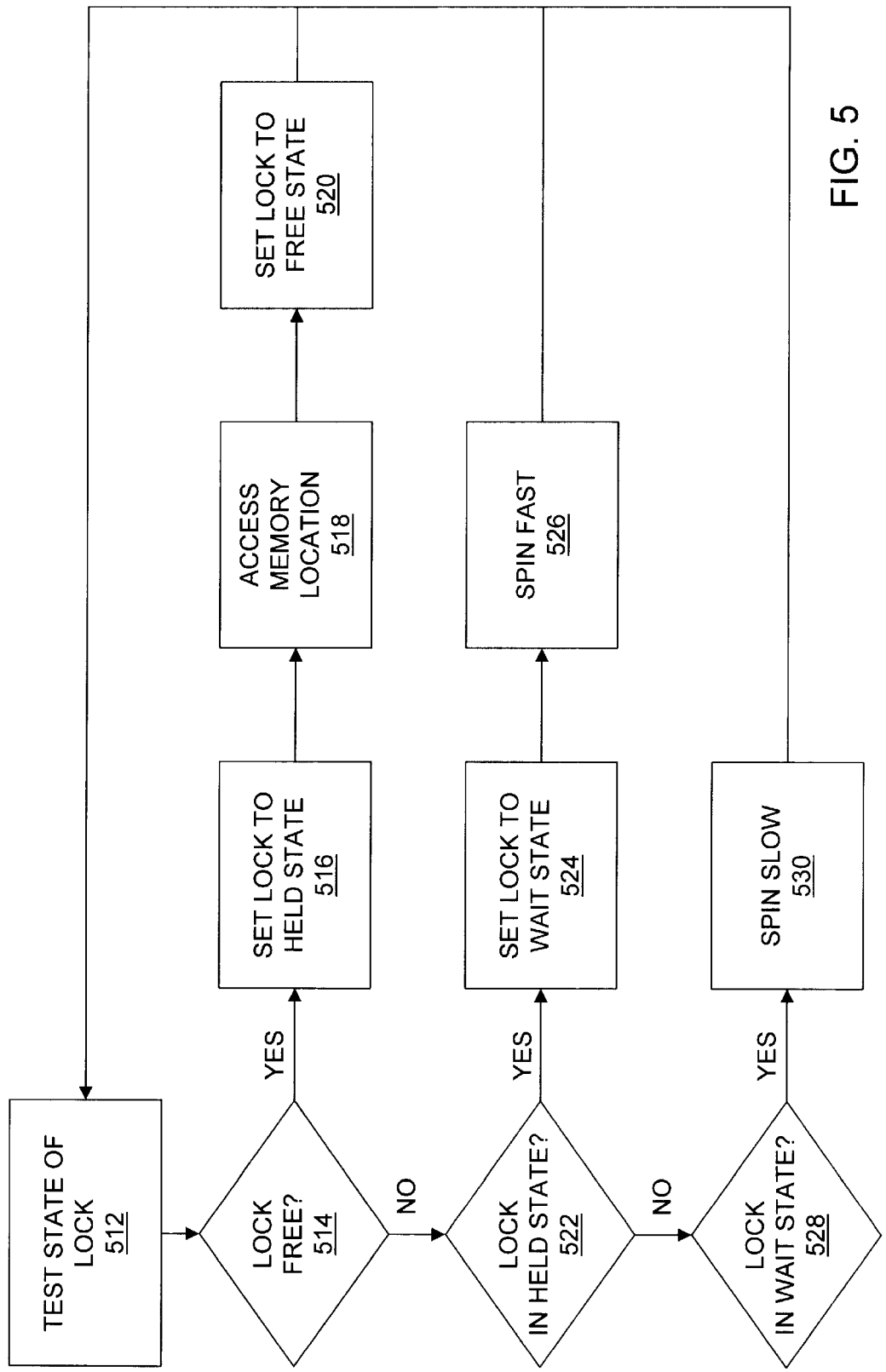
FIG. 5 is a flowchart illustrating the operation of a lock algorithm according to one embodiment of the present invention.

Turning now to FIG. 5, a flowchart illustrating the operation of a lock algorithm according to one embodiment of the present invention is shown. In the illustrated embodiment, the lock may be in one of three lock states. In one embodiment, the state of the lock is determined by a value stored to the lock. The first state is called the "free" state and indicates that no requester has acquired the lock. The second state is called the "held" state and indicates that a requester has acquired the lock, but there is no first waiting contender. The third state is called the "wait" state and indicates that a requester has acquired the lock and a first waiting contender is established. In one embodiment, the current state of the lock is encoded and stored in a single lock location. Accordingly, the storage space required to implement a probabilistic queue may be as little as two bits. The unlock operation, or releasing the lock, is accomplished by simply writing zero to the lock.

In one embodiment, each requester runs a lock algorithm similar to the algorithms discussed below. In step 512, a requester tests the state of the lock. In one particular embodiment, testing the state of the lock involves reading the current state of the lock and comparing it to possible lock states. In step 514, it is determined whether the lock is in the free state. If the lock is in the free state, then in step 516 the lock state is set to the held state. In step 518, the requester accesses the memory location corresponding to the lock. In step 520, the requester sets the lock to the free state. The lock is then available for another requester to acquire.

If in step 514 the lock is not in the free state, then in step 522 it is determined whether the lock is in the held state. If the lock is in the held state, the requester becomes the first waiting contender. In step 524, the lock state is set to the wait state. In step 526, the requester spins fast. As discussed above, spinning fast may involve waiting in a tight loop for the state of the lock to change. When the state of the lock changes, execution continues at step 512.

If in step 522 the lock is not in the held state, then in step 528 it is determined whether the lock is in the wait state. If the lock is in the wait state, then the requester becomes an other waiting contender. In step 530, the requester spins slow. As discussed above, spinning slow involves delaying a predetermined duration prior to testing the state of the lock. When the requester detects that the state of the lock is modified, execution continues at step 512.

Because the first waiting contender is spinning at a faster rate than the other waiting contenders, it is highly probable that the first waiting contender will detect the change of state of the lock before the other waiting contenders. When the first waiting contender detects the change in state, it will attempt to acquire the lock. In most instances, the first waiting contender will acquire the lock before any of the other waiting contenders detect the change of state. The first other waiting contender to detect the change of state will test the lock and become the first waiting contender. The subsequent other waiting contenders will test the lock and determine that the lock is in the wait state and not attempt to modify the lock. It is possible that one or more of the other waiting contenders may detect the change of state of the lock before or soon after the first waiting contender. In this situation, two or more requesters may contend for the lock.

Figure 6:
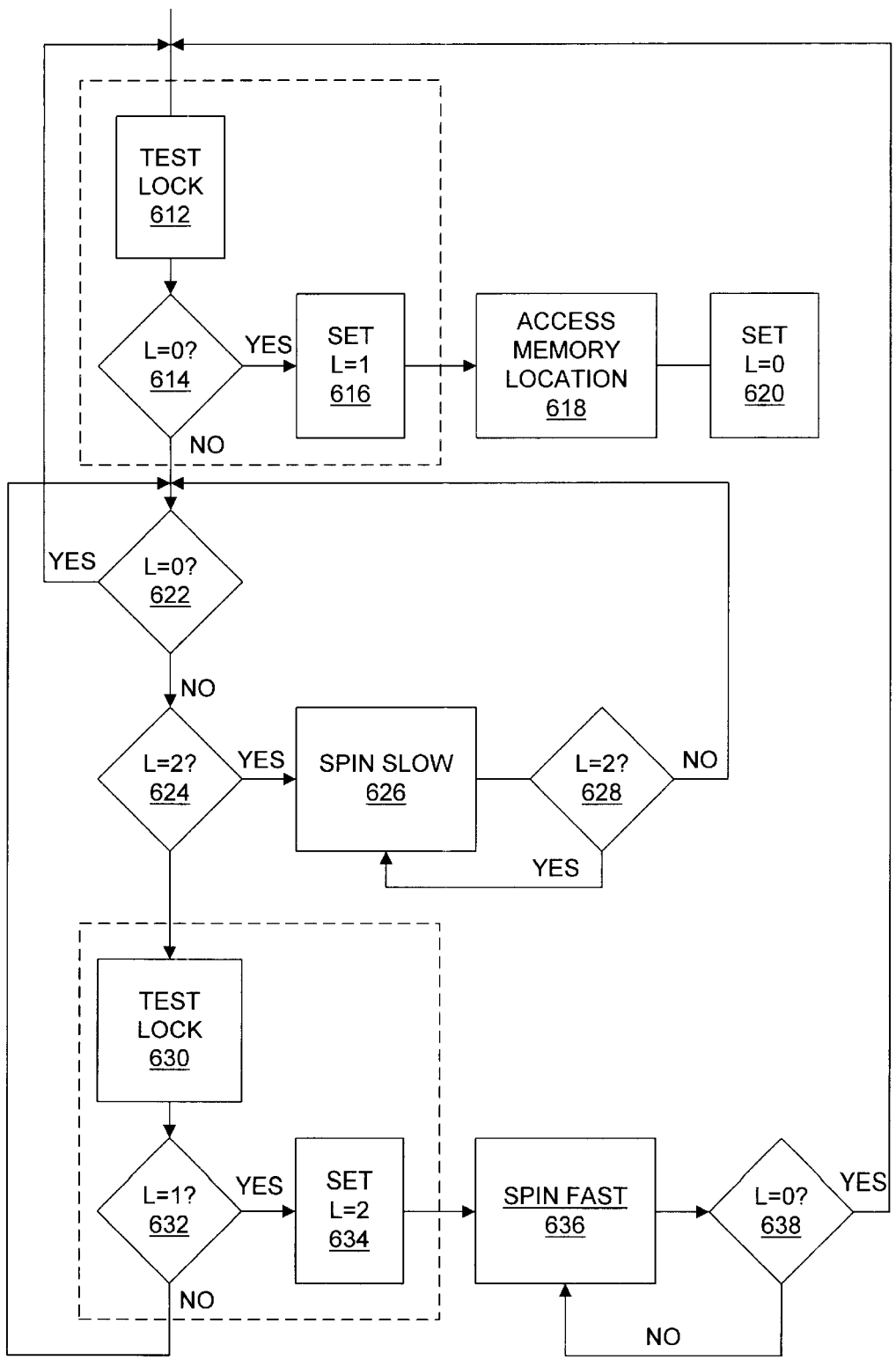
FIG. 6 is a flowchart illustrating the operation of a lock algorithm with three locks states according to one embodiment of the present invention.

Turning now to FIG. 6, a flowchart illustrating the operation of a lock algorithm with three locks states according to one embodiment of the present invention is shown. FIG. 6 illustrates a probabilistic lock algorithm. In one embodiment, each requester executes the probabilistic lock algorithm to synchronize access to a memory location that corresponds to a lock. A similar algorithm may be used to synchronize access to other memory locations. In the illustrated embodiment, there are three possible lock states: free, held and wait. Each state may be assigned a unique encoding. In the illustrated embodiment the encoding for the free state is zero, the encoding for the held state is one, and the encoding for the wait state is two.

In step 612, the current state of the lock is tested. In one embodiment, testing the current state of the lock involves reading the lock state and comparing the lock state to the possible lock states. In step 614, it is determined whether the lock state is zero, which corresponds to the free state. If the lock state is zero, then in step 616 the lock state is set to one, which corresponds to the held state. In step 618, the requester accesses the corresponding memory location. In step 620, the requester sets the lock state to zero. Accordingly, if the lock state is free, the requester acquires the lock, accesses the corresponding memory location and frees the lock.

In one embodiment, an atomic operation is used to test and set the lock state. In one embodiment, an atomic compare and set (CAS) operation is used to read, compare and set the lock value. For example, the command "cas lock, 0, 1" reads the lock value and sets the lock value to one if the lock value is zero. If the lock value is not zero, the lock value is not changed. Steps 612, 614 and 616 may be accomplished by the above CAS command. It is noted, the other atomic commands may be used.

In step 622, it is determined whether the lock value is still zero. This step handles the case were the lock value changes back to zero after step 614. If the lock value is zero, execution continues at step 612. Alternatively, if the lock value is not zero, then in step 624, it is determined whether the lock value is two, which corresponds to the wait state. If the lock value is two, then in step 626 the requester begins to spin slow. As discussed above, spinning slowly includes waiting a predetermined duration prior to attempting to acquire the lock again. After the predetermined duration, in step 640 it is determined whether the lock value is two. If the lock value is not two, then execution continues at step 622. Alternatively, if the lock value is not two, then execution continues at step 626 and the requester continues to spin. In an alternative embodiment, an optimistic approach may be used and step 628 may be performed prior to step 626. In other words, the state of lock may be checked prior to the first delay.

If in step 624 the lock value is not two, then in step 630 the lock value is tested. In step 632, it is determined whether the lock value is one. If the lock value is not one, then execution continues its step 622. If the lock value is one, then in step 634 the lock value is set to two. In step 636, the requester spins fast. As discussed above, in one embodiment, spinning fast is a tight loop reading the state of the lock value. In the illustrated embodiment, the tight loop includes 638 and 640. In step 640, it is determined whether the lock value is zero. If the lock value is not zero, then execution continues at step 636. If the lock value is zero, then execution continues at step 612. In one embodiment, steps 630, 632 and 634 are performed by an atomic command. In one particular embodiment, the command "cas lock, 1, 2" reads the lock value and sets the lock value to 2 if the lock value is 1.

It is noted that the above flowchart can result in multiple first waiting contenders. This anomaly does not affect the correctness of the lock because the exclusivity of the lock is guaranteed. In other words, two requesters cannot acquire the lock concurrently. To prevent this anomalous condition would require more overhead in the unlock operation which may slow down the algorithm. In a preferred embodiment, the anomalous condition is maintained because it does not affect the correctness of the lock. The anomalous condition may occur when there is a first waiting contender and a plurality of other waiting contenders. If the lock owner frees the lock and an other waiting contender acquires the lock prior to the first waiting contender, the other waiting contender will set the lock value to one. A second other waiting contender may then detect that the lock is set to one, set the lock to two, and become another first waiting contender before the original first waiting contender observes that the lock has changed state. For this anomaly to occur two unusual sets of conditions must occur. First, it is highly probable that the first waiting contender, which is spinning fast, will detect and acquire a lock before an other waiting contender, which is spinning slow. For an other waiting contender to acquire the lock, it would have to perform steps 628, 622, 624, 630, and 632 before the first waiting contender performs step 640. Even if an other waiting contender does acquire the lock, a second other waiting contender would subsequently has to perform steps 628, 622, and 624 before the first waiting contender performs step 640. This set of conditions is very unlikely to occur and as noted above does not effect the correctness of the lock.

The total number of bus transactions required to transfer the lock in the most likely case of the probabilistic queue is N+3. The number transactions discussed below assumes a snooping coherency management protocol. It is noted that the present invention is also applicable to other coherency management protocols, such as a directory-based coherency management protocols. When a lock owner (R0) frees the lock, it invalidates all the other requester's cached copies of the lock (one invalidate bus transaction). With high probability, the first waiting contender (R1) detects the changed state, for example by a cache miss, and tests the lock (one read-to-share bus transaction). The first waiting contender (R1) then writes to its cached copy of the lock and cause a second invalidation of the cached copies of the locks in other waiting contenders (one invalidate bus transaction). If the slow spin loop is sufficiently long, the other requesters receive this second invalidation before the requesters test the lock so the second invalidation is redundant to the first invalidation. The first of the other waiting contenders (R2) to detect the change in state reads the value of the lock (one read-to-share bus transaction). Other waiting contender (R2) then writes to the lock to become the first waiting contender (one read-to-own bus transaction). This causes a third invalidation of the lock (one invalidate bus transaction). If the slow spin loop is sufficiently long, the other requesters receive this third invalidation before they test the lock and the third invalidation is redundant to the first two invalidations. The remaining other waiting contenders subsequently generate cache misses and read the state of the lock (N−2 read-to-share bus transactions). Because the lock is in the wait state, these other waiting contenders do not generate writes to the lock when they read the lock state. If one or more other waiting contenders test the lock during the transfer, these other waiting contenders may generate additional bus transactions, which may increase the number of transactions, but not substantially.

Figure 7:
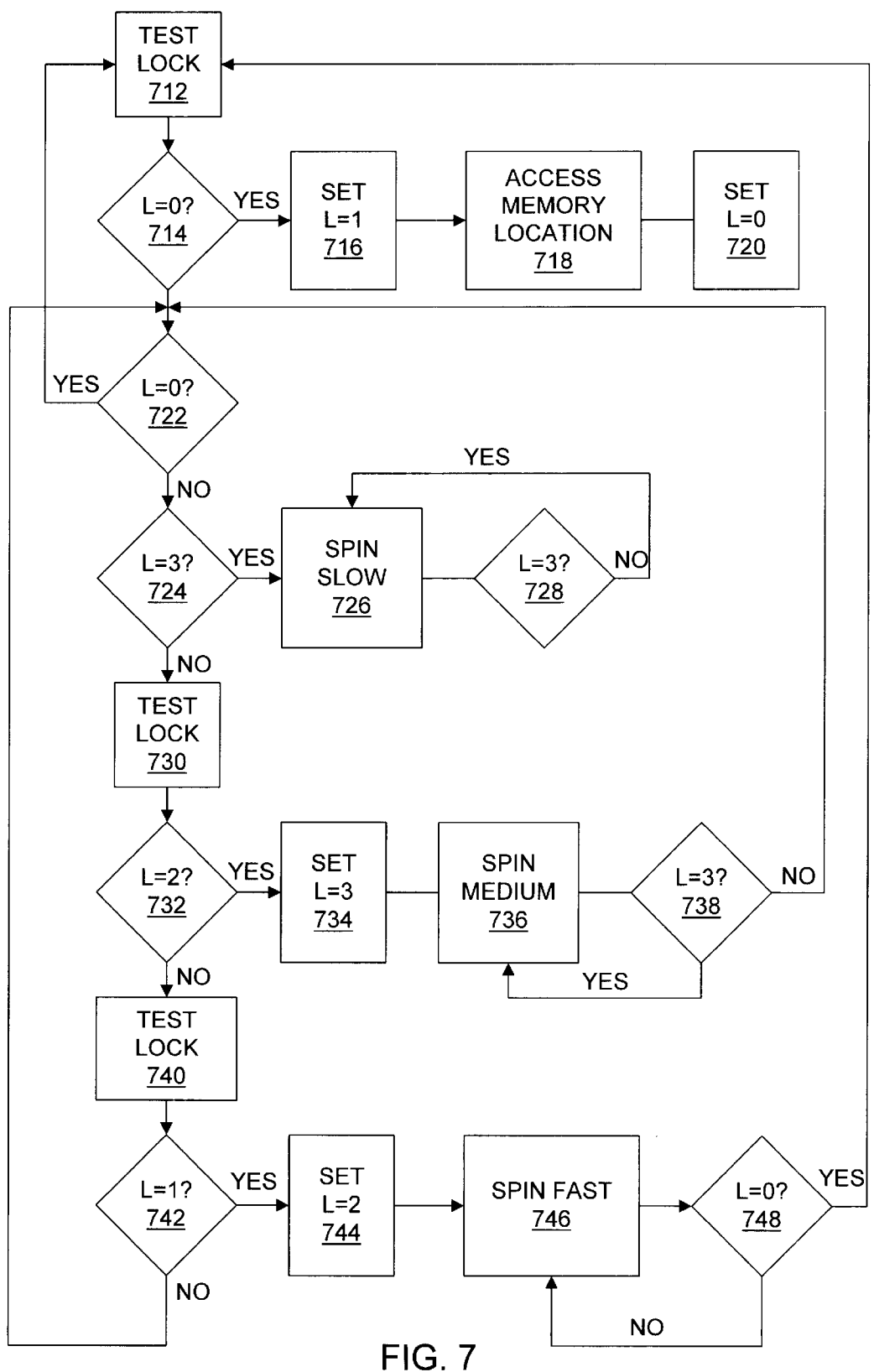
FIG. 7 is a flowchart illustrating the operation of a lock algorithm with four lock states according to one embodied in the present invention.

Turning now to FIG. 7, a flowchart illustrating the operation of a lock algorithm with four lock states according to one embodiment of the present invention is shown. In the illustrated embodiment, the lock algorithm includes four lock states. In addition to the three lock states discussed above, this embodiment includes a second held state. A second waiting contender is configured to spin slower than the first waiting contender and faster than the other waiting contenders. It is highly likely that the second waiting contender will become the first waiting contender when the first waiting contender acquires a lock. The lock stores an encoded value representing the current state of the lock. The encoding for the held state is zero, the encoding for the first held state is one, the encoding for the second held state is two, and the encoding for the wait state is three.

In step 712, the current state of the lock is tested. In step 714, it is determined whether the lock value is zero, which corresponds to the free state. If the lock value is zero, then in step 716 the lock value is set to one, which corresponds to the first held state. In step 718, the requester accesses the corresponding memory location. In step 720, the requester sets the lock state to zero. Accordingly, if the lock state is free, the requester acquires the lock, accesses the corresponding memory location and frees the lock. Steps 712, 714 and 716 may be accomplished by an atomic command.

In step 722, it is determined whether the lock value is still zero. This step handles the case were the lock value changes back to zero after step 714. If the lock value is zero, execution continues at step 712. Alternatively, if the lock value is not zero, then in step 724 it is determined whether the lock value is three. If the lock value is three, then in step 726 the requester begins to spin slow. After a predetermined delay, in step 728 it is determined whether the lock value is three. If the lock value is not three, then execution continues at step 722. Alternatively, if the lock value is three, then execution continues at step 726 and the requester continues to spin.

If in step 724 the lock value is not three, then in step 730 the lock value is tested. In step 732 it is determined whether the lock value is two. If the lock value is two, then in step 734 the lock value is set to three. In step 736, the requester spins medium. A requester that spins medium implements a delay prior to attempting to acquire the lock. The delay is shorter than the delay for a slow spinning requester. In step 738, it is determined whether the lock value is three. If the lock value is three, then execution continues at step 736. If the lock value is not three, then execution continues at step 712. In one embodiment, steps 730, 732 and 734 are performed by an atomic command.

If in step 732 the lock value is not two, then in step 740 the lock value is tested. In step 742, it is determined whether the lock value is one. If the lock value is not one, then execution continues at step 722. If the lock value is one, then in step 744 the lock value is set to two. In step 746, the requester spins fast. In step 750, it is determine whether the lock value is zero. If the lock value is not zero, then execution continues at step 746. If the lock value is zero, then execution continues at step 712. In one embodiment, steps 740, 742 and 744 are performed by an atomic command.

In other embodiments, additional held states may be included. For example, the present invention may be implemented with an owner, a first waiting contender, a second waiting contender, a third waiting contender and one or more other waiting contenders.

Numerous variations and modifications will become apparent to those skilled in the art once the above disclosure is fully appreciated. It is intended that the following claims be interpreted to embrace all such variations and modifications.

What is claimed is:

1. A method of synchronizing access to a resource in a computer system that includes a lock corresponding to said resource and a plurality of requesters that may attempt to access said resource, wherein said lock has at least three lock states, said method comprising:

a first requester of said plurality of requesters requesting acquisition of said lock;

if said lock is in a first state, said first requester setting said lock to a second state and acquiring said lock;

if said lock is in said second state, said first requester setting said lock to a third state and spinning at a first rate; and if said lock is in said third state, said first requester spinning at a second rate.

2. The method as recited in claim 1, wherein said first state is indicative of said resource being available for acquisition.

3. The method as recited in claim 1, wherein said second state is indicative of said resource not being available for acquisition and causing a second requester to become a first waiting contender for said lock.

4. The method as recited in claim 3, wherein said first rate is faster than said second rate.

5. The method as recited in claim 1, wherein said third state is indicative of said resource not being available for acquisition and causing a third requester to become another waiting contender for said lock.

6. The method as recited in claim 1, wherein said spinning at a first rate includes executing a first software loop to query said lock to determine if said lock is in said first, second or third state.

7. The method as recited in claim 1, wherein said spinning at a second rate includes executing a second software loop to query said lock to determine if said lock is in said first, second or third state, wherein said second software loop includes a delay.

8. The method as recited in claim 1, wherein said first, second and third states correspond to three values in a register.

9. The method as recited in claim 8, wherein said first state is a free state.

10. The method as recited in claim 8, wherein said second state is a held state.

11. The method as recited in claim 8, wherein said third state is a wait state.

12. A computer system comprising:

a resource;

a plurality of requesters coupled to said resource and configured to request access to said resource;

a lock coupled to said resource and configured to synchronize access to said resource, wherein said lock has at least a first state, a second state and a third state;

wherein, in response to a first requester of said plurality of requesters determining that said lock is in said first state, said first requester of said plurality of requesters is configured to set said lock to said second state and acquire said lock;

wherein, in response to a second requester of said plurality of requesters determining that said lock is in said second state, said second requester of said plurality of requesters is configured to set said lock to said third state and to spin at a first rate; and wherein, in response to a third requester of said plurality of requesters determining that said lock is in said third state, said third requester of said plurality of requesters is configured to spin at a second rate.

13. The computer system as recited in claim 12, wherein said first rate is faster than said second rate.

14. The computer system as recited in claim 12, wherein spinning at said first rate includes executing a first software loop to query said lock to determine if said lock is in said first, second or third state.

15. The computer system as recited in claim 14, wherein spinning at said second rate includes executing a second software loop to query said lock to determine if said lock is in said first, second or third state, wherein said second software loop includes a delay.

16. The computer system as recited in claim 15, wherein if said lock is in said second state, then said second requester of said plurality of requesters is configured to become a first waiting contender for said lock.

17. The computer system as recited in claim 12, wherein said first, second and third states correspond to three values in a register.

18. The computer system as recited in claim 17, wherein said first state is a free state.

19. The computer system as recited in claim 17, wherein said second state is a held state.

20. The computer system as recited in claim 17, wherein said third state is a wait state.

* * * * *